US012597748B2

(12) United States Patent
Chin

(10) Patent No.: US 12,597,748 B2
(45) Date of Patent: Apr. 7, 2026

(54) ELECTRICAL CONNECTOR AND BASE

(71) Applicant: ENERGY FULL ELECTRONICS CO., LTD., New Taipei (TW)

(72) Inventor: Hsu-Shen Chin, New Taipei (TW)

(73) Assignee: ENERGY FULL ELECTRONICS CO., LTD., New Taipei (TW)

( * ) Notice: Subject to any disclaimer, the term of this patent is extended or adjusted under 35 U.S.C. 154(b) by 354 days.

(21) Appl. No.: 18/130,435

(22) Filed: Apr. 4, 2023

(65) Prior Publication Data

US 2024/0079833 A1 Mar. 7, 2024

(30) Foreign Application Priority Data

Sep. 5, 2022 (TW) ................................ 111133616

(51) Int. Cl.

*H01R 24/76* (2011.01)
*H01R 31/06* (2006.01)
*H01R 105/00* (2006.01)

(52) U.S. Cl.

CPC ............ *H01R 24/76* (2013.01); *H01R 31/06* (2013.01); *H01R 2105/00* (2013.01)

(58) Field of Classification Search

CPC .... H01R 24/76; H01R 31/06; H01R 2105/00; H01R 35/04; H01R 39/00; H01R 39/64

See application file for complete search history.

(56) References Cited

U.S. PATENT DOCUMENTS 5,007,848 A * 4/1991 Lee ........................ H01R 27/02 439/651
6,010,347 A * 1/2000 Lee .......................... H01R 4/36 439/441
6,089,921 A * 7/2000 Chou ..................... H01R 35/04 439/640
6,302,743 B1 * 10/2001 Chiu .................... H01R 25/003 439/652
6,332,794 B1 * 12/2001 Tzeng Jeng ........... H01R 35/04 439/13
6,881,083 B2 * 4/2005 Vargas ................. H01R 25/164 439/211

(Continued)

FOREIGN PATENT DOCUMENTS

CN 205141261 U 4/2016
CN 207338849 U 5/2018

(Continued)

*Primary Examiner* — Thanh Tam T Le
(74) *Attorney, Agent, or Firm* — Rivka Friedman

(57) ABSTRACT

The electrical connector includes an upper insulating shell, a lower insulating shell, a first-polarity conductive terminal, a second-polarity conductive terminal, a third-polarity conductive terminal, a first conductor, a second conductor, and a third conductor. A first contact portion of the first conductor, A second contact portion of the second conductor and A third contact portion of the third conductor are positioned outside the lower insulating shell. A distance between the second contact portion of the second conductor and the first contact portion of the first conductor is a first distance. A distance between the third contact portion of the third conductor and the first contact portion of the first conductor is a second distance, and the first distance is shorter than the second distance.

11 Claims, 11 Drawing Sheets

(56) References Cited

U.S. PATENT DOCUMENTS

| | | | | |
|---|---|---|---|---|
| 7,121,834 | B2 * | 10/2006 | Gerard | H01R 35/04 439/21 |
| 7,204,727 | B2 * | 4/2007 | Germani | H01R 4/4816 439/106 |
| 7,214,102 | B2 * | 5/2007 | Chong | H01R 35/04 439/640 |
| 7,500,854 | B2 * | 3/2009 | Gottstein | H01R 25/006 439/21 |
| 7,736,174 | B2 * | 6/2010 | Bhosale | H01R 24/76 439/535 |
| 7,740,484 | B1 * | 6/2010 | Chiang | H01R 39/64 439/13 |
| 8,105,091 | B2 * | 1/2012 | Nishihira | H01R 24/38 439/39 |
| 8,142,199 | B1 * | 3/2012 | Almouli | H01R 25/142 439/640 |
| 9,325,128 | B2 | 4/2016 | Chen et al. | |
| 9,450,365 | B1 * | 9/2016 | Baldwin | H01R 24/76 |
| 10,014,639 | B1 * | 7/2018 | Satyanarayanan | H01R 13/7137 |
| 10,297,967 | B2 * | 5/2019 | Wei | H01R 31/06 |
| 10,418,768 | B1 * | 9/2019 | Xiao | H01R 35/04 |
| 10,686,285 | B2 | 6/2020 | Cai et al. | |
| 10,985,490 | B1 * | 4/2021 | Ding | H01R 24/76 |
| 11,011,878 | B1 * | 5/2021 | Baldwin | H01R 13/639 |
| 12,327,941 | B2 * | 6/2025 | Kinney | H01R 12/7076 |

FOREIGN PATENT DOCUMENTS

| | | | |
|---|---|---|---|
| CN | 112038817 | A | 12/2020 |
| CN | 216903653 | U | 7/2022 |
| CN | 218498497 | U | 2/2023 |
| CN | 218849898 | U | 4/2023 |
| CN | 219246994 | U | 6/2023 |
| DE | 102011014920 | A1 | 9/2012 |
| TW | M490684 | U | 11/2014 |
| TW | 201613207 | A | 4/2016 |
| TW | 201911676 | A | 3/2019 |
| TW | 202017268 | A | 5/2020 |
| TW | M636850 | | 1/2023 |
| TW | M640767 | U | 5/2023 |

* cited by examiner

ELECTRICAL CONNECTOR AND BASE

CROSS REFERENCE TO RELATED APPLICATION

This application claims the priority of Taiwanese Patent Application No. 111133616, entitled "ELECTRICAL CONNECTOR AND BASE", filed on Sep. 5, 2022, the disclosure of which is incorporated herein by reference in its entirety.

FIELD OF THE DISCLOSURE

The present disclosure relates to an electrical connector and its base, and more particularly, to an electrical connector and its base that can realize non-directional docking.

BACKGROUND

As the market demand for cables is getting higher and higher, the specifications of the matching connectors are more stringent, and more and more attention is paid to the connector components of different interfaces. The structure of the contact interface determines the electrical and mechanical properties of the connector, such as resistance value, mating force and durability. However, usually in a connector assembly, the connector and its base are connected in a specific direction, and the user can only assemble according to the set direction.

If the connector is incorrectly assembled, the pins of the connector will be damaged, and the electronic equipment will be reimbursed in severe cases. Therefore, in order to avoid the occurrence of unexpected situations, which results in the malfunction of the connector assembly and in order to allow designers to design the circuit layout without limitations, a connector assembly where the connector and its base has no specific assembly direction is needed.

SUMMARY

One objective of an embodiment of the present disclosure is to provide an electrical connector. The electrical connector includes an upper insulating shell, a lower insulating shell, a first-polarity conductive terminal, a second-polarity conductive terminal, a third-polarity conductive terminal, a first conductor, a second conductor, and a third conductor. The upper insulating shell, has at least one socket. The lower insulating shell is arranged under the upper insulating shell and connected with the upper insulating shell. The first-polarity conductive terminal is provided with a first elastic piece portion and a first connecting portion. The first elastic piece portion is correspondingly arranged with a socket of the upper insulating shell. The second-polarity conductive terminal is provided with a second elastic piece portion and a second connecting portion. The second elastic piece portion is correspondingly arranged with a socket of the upper insulating shell. The third-polarity conductive terminal, provided with a third elastic piece portion and a third connecting portion. The third elastic piece portion is correspondingly arranged with an insertion hole of the upper insulating shell. The first conductor is electrically connected to the first connecting portion of the first-polarity conductive terminal and has a first fixing portion and a first contact portion. The first fixing portion allows the first conductor to be fixed to the lower insulating shell. The second conductor is electrically connected to the second connecting portion of the second-polarity conductive terminal and has a second fixing portion and a second contact portion. The second fixing portion allows the second conductor to be fixed to the lower insulating shell. The third conductor is electrically connected to the third connecting portion of the third-polarity conductive terminal and has a third fixing portion and a third contact portion. The third fixing portion allows the third conductor to be fixed to the lower insulating shell. The first contact portion of the first conductor, the second contact portion of the second conductor and the third contact portion of the third conductor are positioned outside the lower insulating shell. A distance between the second contact portion of the second conductor and the first contact portion of the first conductor is a first distance. A distance between the third contact portion of the third conductor and the first contact portion of the first conductor is a second distance, and the first distance is shorter than the second distance.

According to another embodiment of the present disclosure, a base includes a first insulating shell, a second insulating shell, a first isolation portion, a second isolation portion, a first outer ring terminal, a first inner ring terminal, a second outer ring terminal, and a second inner ring terminal. The first insulating shell includes at least one socket. The second insulating shell is positioned under the first insulating shell and connected with the first insulating shell. The first isolation portion has a socket. The second isolation portion has a socket. The first isolation portion and the second isolation portion are positioned between the first insulating shell and the second insulating shell. The central terminal is provided with a central docking portion and a center connecting portion. The central docking portion is disposed correspondingly to a socket of the second isolation portion, and the center connecting portion allows the central terminal to be fixed between the first insulating shell and the second insulating shell. The first outer ring terminal is provided with a first outer ring docking portion and a first outer ring welding portion. The first outer ring docking portion is arranged correspondingly to a socket of the first insulating shell and is positioned between the first insulating shell and the first isolation portion, and the first outer ring welding portion is positioned between the second insulating shell and the second isolation portion. The first inner ring terminal is provided with a first inner ring docking portion and a first inner ring welding portion. The first inner ring docking portion is arranged correspondingly to a socket of the first insulating shell and is positioned between the first insulating shell and the first isolation portion. The first inner ring welding portion is positioned between the second insulating shell and the second isolation portion. The second outer ring terminal is provided with a second outer ring docking portion and a second outer ring welding portion. The second outer ring docking portion is arranged correspondingly to a socket of the first isolation portion and is positioned between the first isolation portion and the second isolation portion, and the second outer ring welding portion is positioned between the second insulating shell and the second isolation portion. The second inner ring terminal is provided with a second inner ring docking portion and a second inner ring welding portion. The second inner ring docking portion is arranged correspondingly to a socket of the first isolation portion and is positioned between the first isolation portion and the second isolation portion, and the second inner ring welding portion is positioned between the second insulating shell and the second isolation portion. The first outer ring docking portion of the first outer ring terminal and the first inner ring docking portion of the first inner ring terminal are disposed correspondingly to a same socket, and the second outer ring docking portion of the second outer ring terminal and the second inner ring docking portion of the second inner ring terminal are disposed correspondingly to a same socket.

To sum up, in the electrical connector and its base provided by the present disclosure, the structural design of the contact interface does not have a specific assembly direction, so as to realize non-directional docking and save the cost of the foolproof structure. Furthermore, the designer could have a better flexibility in the circuit layout.

These and other features, aspects and advantages of the present disclosure will become understood with reference to the following description, appended claims and accompanying figures.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION OF PREFERRED EMBODIMENTS

In order to facilitate understanding the technical features, content and advantages of the invention and the efficacy it can achieve, the present disclosure is hereby combined with the accompanying drawings, and the expression of the embodiment is described in detail as follows, and the scheme used therein, the main purpose of which is only for illustrative and auxiliary explanation purposes, may not be the true proportion and precise configuration of the embodiment of the present disclosure, so the proportion and configuration relationship of the attached drawing should not be interpreted, limiting the scope of rights of the invention in the actual implementation.

Spatially relative terms, such as “beneath”, “below”, “lower”, “above”, “upper” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures.

The following will refer to the relevant drawings, illustrating various embodiments of the electrical connector and base according to the present disclosure, for ease of understanding, the same components in the following embodiments are illustrated by the same symbols.

Figure 1A:
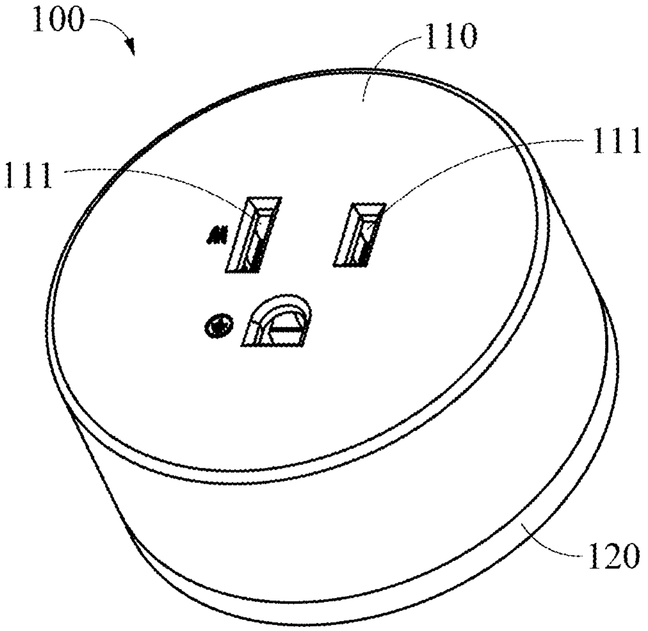
FIG. 1A is a diagram of an electrical connector according to a first embodiment of the present disclosure.
Figure 1B:
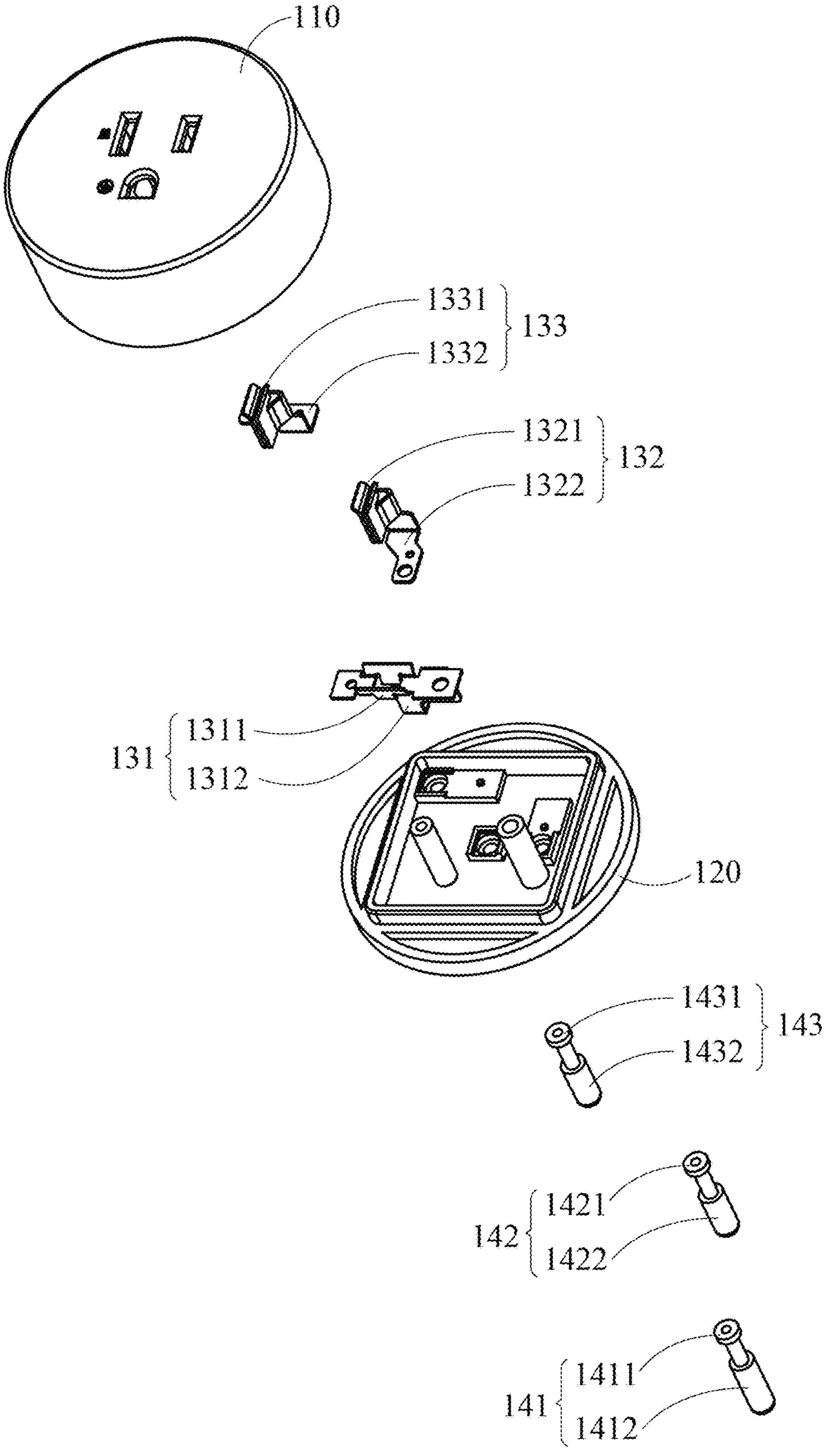
FIG. 1B is an exploded view of the electrical connector shown in FIG. 1A.
Figure 1C:
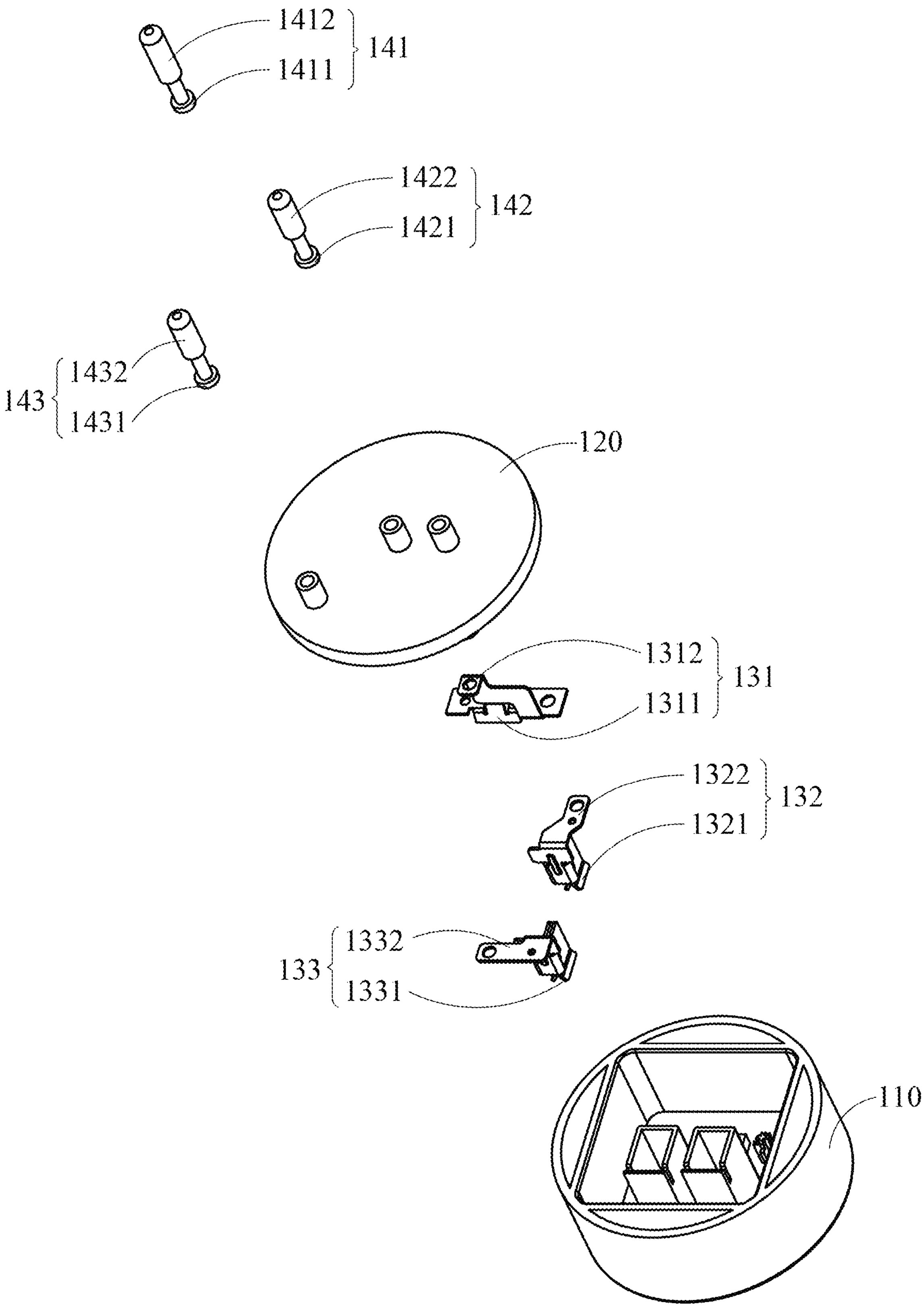
FIG. 1C is an exploded view of the electrical connector shown in FIG. 1A from another view angle.
Figure 2:
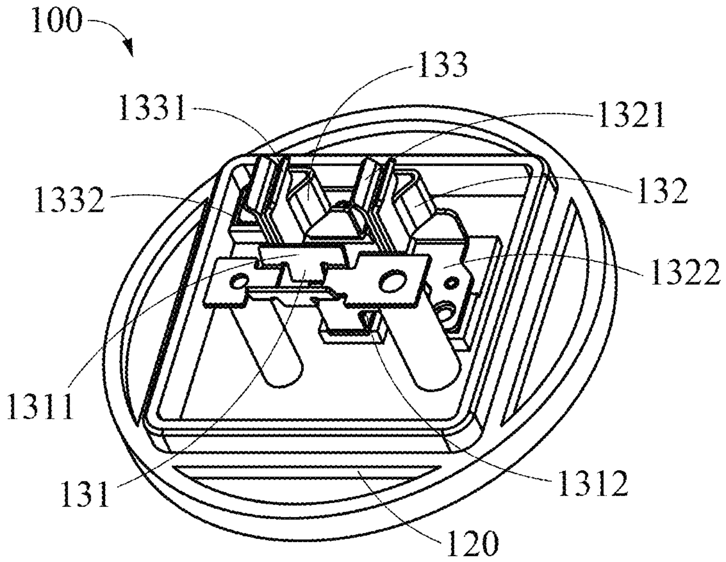
FIG. 2 is a diagram of the electrical connector without the upper insulating shell according to the first embodiment of the present disclosure.

Please refer to FIGS. 1A-1C and FIG. 2. FIG. 1A is a diagram of an electrical connector according to an embodiment of the present disclosure. FIG. 1B is an exploded view of the electrical connector shown in FIG. 1A. FIG. 1C is an exploded view of the electrical connector shown in FIG. 1A from another view angle. FIG. 2 is a diagram of an electrical connector without the upper insulating shell according to an embodiment of the present disclosure. The electrical connector 100 comprises an upper insulating shell 110, a lower insulating shell 120, a terminal member and a conductor member. The upper insulating shell 110 has at least socket 111 for connecting with another electronic device. The lower insulating shell 120 is positioned under the upper insulating shell 110 and connected with the upper insulating shell 110 to form a cavity for accommodating the terminal member and the conductor member.

As shown in FIG. 1A, the upper insulating shell 110 is provided with three sockets 111, and the electrical connector 100 is an outlet. However, the shape and quantity of the sockets are not limited here. In some embodiments, the number of the sockets 111 can be one or two, and the shape can be square or circular as long as the number and the shape meet users’ demands. In this embodiment, the electrical connector 100 is cylindrical and can be movably assembled, but it is not limited thereto. In other embodiments, the electrical connector 100 can be arranged in an electronic device or used with a connecting wire.

Figure 11:
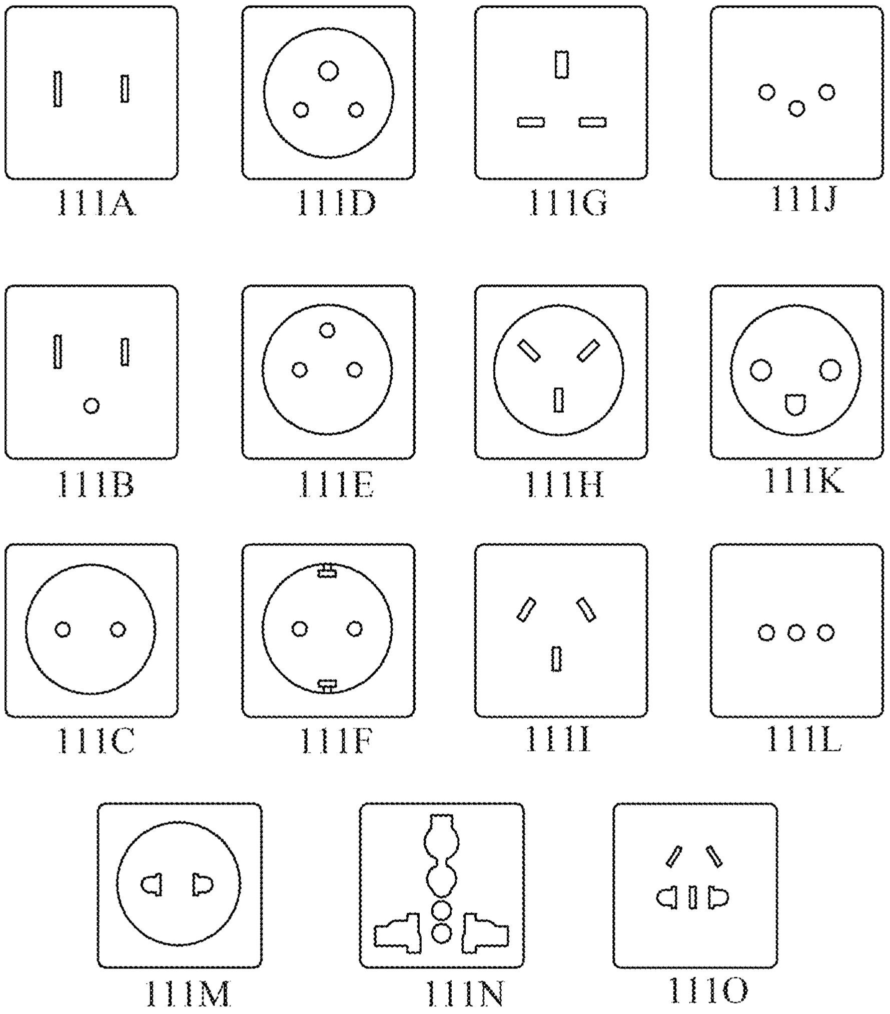
FIG. 11 is a top view of sockets of various specifications applicable to the electrical connector of each embodiment of the present disclosure.

Please refer to FIG. 11. FIG. 11 is a top view of sockets 111 of various specifications applicable to the electrical connector 100. The electronic device can insert its plug into the socket 111 to obtain the power supply. As shown in FIG. 11, the socket 111 can be a power socket of 100~420V or 200~240V of the general utility power. The socket 111 can be a power socket of different specifications, such as Type A power socket 111A, type B power socket 111B, type C power socket 111C, type D power socket 111D, type E power socket 111E, type F power socket 111F, type G power socket 111G, type H power socket 111H, type I power socket Hole 111I, type J power socket 111J, type K power socket 111K, type L power socket 111CL and other power sockets of different specifications, or universal power sockets, such as Type A and Type C universal socket 111M, multinational universal sockets 111N and 111O, etc.

In addition, the socket 111 can also be a universal serial bus (USB) socket 111, which is used to supply power to electronics devices using Universal serial bus comply with USB2.0, USB2.0 A, USB2.0 Type C, USB3.0 and USB3.1 standards.

As shown in FIGS. 1A-1C and FIG. 2, the terminal member is disposed between the upper insulating shell 110 and the lower insulating shell 120. The terminal member includes a first-polarity conductive terminal 131, a second-polarity conductive terminal 132 and a third-polarity conductive terminal 133. As shown in FIG. 2, the arrangement of the internal terminal members in the electrical connector 100 can be clearly seen with the upper insulating shell 110 removed. The first-polarity conductive terminal 131 is provided with a first elastic piece portion 1311 and a first connecting portion 1312. The second-polarity conductive terminal 132 is provided with a second elastic piece portion 1321 and a second connecting portion 1322, and the second elastic piece portion 1321 is disposed correspondingly to a socket 111 of the upper insulating shell 110. The third-polarity conductive terminal 133 is provided with a third elastic piece portion 1331 and a third connecting portion 1332, and the third elastic piece portion 1331 is disposed correspondingly to a socket 111 of the upper insulating shell 110.

Specifically, the structure and quantity of the terminal members and the manner in which they are fixed between the upper insulating shell 110 and the lower insulating shell 120 are not limited here. In this embodiment, when the electrical connector 100 is docked with other electronic devices, the pins of the electronic device pass through the sockets 111 of the upper insulating shell 110 and electrically connect with the first elastic piece portion 1311 of the first-polarity conductive terminals 131, the second elastic piece portion 1321 of the second-polarity conductive terminal 132 and the third elastic piece portion 1331 of the third-polarity conductive terminal 133 in the terminal member.

Figure 3:
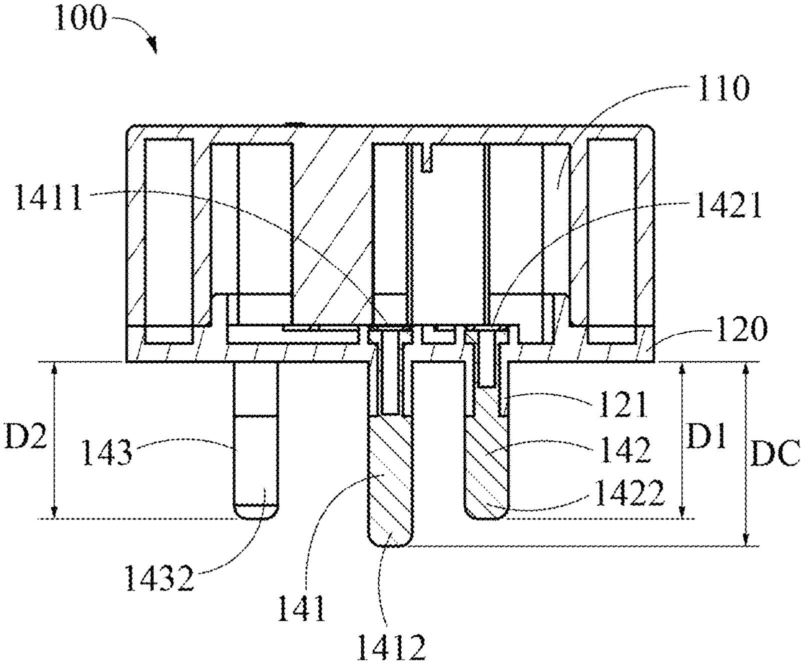
FIG. 3 is a cross-sectional diagram of an electrical connector according to a second embodiment of the present disclosure.
Figure 4:
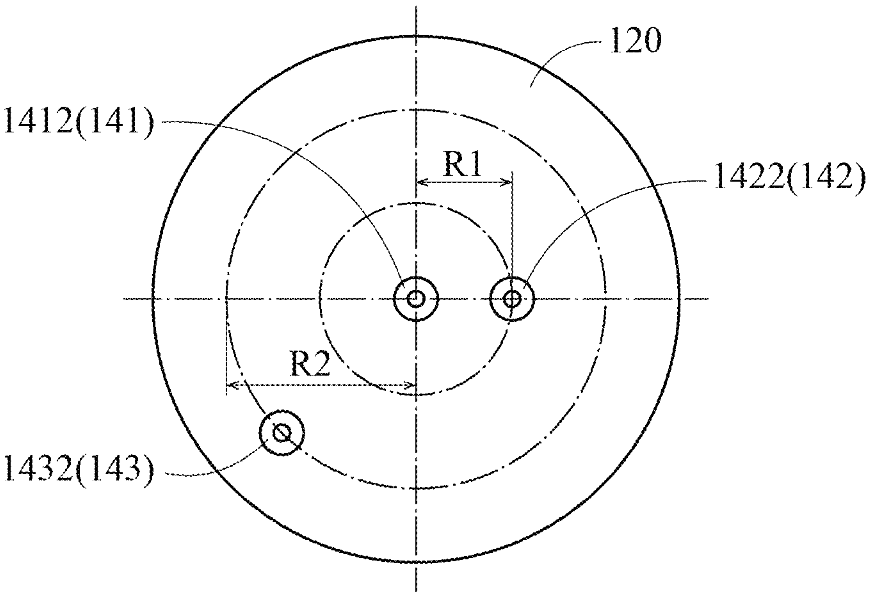
FIG. 4 is a bottom view of the electrical connector according to the second embodiment of the present disclosure.

Please refer to FIG. 3 and FIG. 4. FIG. 3 is a cross-sectional diagram of an electrical connector according to an embodiment of the present disclosure. FIG. 4 is a bottom view of an electrical connector according to an embodiment of the present disclosure. The conductor member passes through the lower insulating shell 120 and includes a first conductor 141, a second conductor 142 and a third conductor 143. In the electrical connector 100, the first conductor 141 is electrically connected to the first connecting portion 1312 of the first-polarity conductive terminal 131. The first conductor has a first fixing portion 1411 and a first contact portion 1412. The first fixing portion 1411 allows the first conductor 141 to be fixed to the lower insulating shell 120. The second conductor 142 is electrically connected to the second connecting portion 1322 of the second polarity conductive terminal 132 and is provided with a second fixing portion 1421 and a second contact portion 1422. The second fixing portion 1421 allows the second conductor 142 to be fixed to the lower insulating shell 120. The third conductor 143 is electrically connected to the third connecting portion 1332 of the third polarity conductive terminal 132 and is provided with a third fixing portion 1431 and a third contact portion 1432. The third fixing portion 1431 allows the third conductor 143 to be fixed to the lower insulating shell 120. The manner in which the conductor member penetrates through the lower insulating shell 120 is not limited herein.

The terminal member and the conductor member can be electrically connected to each other by direct contact, screw-locking contact or welding. However, in other embodiments, the terminal member and the conductor member may be integrally formed, disposed between the upper insulating casing 110 and the lower insulating casing 120, and passing through the lower insulating shell 120.

The first contact portion 1412 of the first conductor 141, the second contact portion 1422 of the second conductor 142 and the third contact portion 1432 of the third conductor 143 are disposed in the lower insulating shell 120. From FIG. 3, the center of the first conductor 141, the center of the second conductor 142 and the center of the third conductor 143 are not aligned in a straight line. In some embodiments, the center of the first conductor 141, the center of the center of the second conductor 142 and the center of the third conductor 143 may be aligned in the same straight line.

In this embodiment, the length DC of the first contact portion 1412 of the first conductor 141 exposed to the lower insulating shell 120 is greater than the length D1 of the second contact portion 1422 of the second conductor 142 exposed to the lower insulating shell 120 or the length D2 of the third contact portion 1432 of the third conductor 143 exposed to the lower insulating shell 120. However, this is not a limitation of the present disclosure. In some embodiments, the length DC of the first contact portion 1412 of the first conductor 141 exposed to the lower insulating shell 120 is the same as the length D1 of the second contact portion 1422 of the second conductor 142 exposed to the lower insulating shell 120 and is also the same as the length D2 of the third contact portion 1432 of the third conductor 143 exposed to the lower insulating shell 120.

The lower insulating shell 120 has an extension portion 121, which is partially covered by the first contact portion 1412 of the first conductor 141, the second contact portion 1422 of the second conductor 142 or the third contact portion 1432 of the third conductor 143. The extension portion 121 is used to form an insulating shield when the electrical connector 100 is being assembled with another electronic device such that the electrical connector 100 could have a certain transmission performance. Please note, the quantity and shape of the extension portion are not limited and could be adjusted according to the specification of the conductor members.

As shown in FIG. 4, the distance between the first contact portion 1412 of the first conductor 141 and the second contact portion 1422 of the second conductor 142 is the first distance R1 and the distance between the first contact portion 1412 of the first conductor 141 and the third contact portion 1432 of the third conductor 143 is the second distance R2. The first distance R1 is shorter than the second distance R2. Specifically, the second contact portion 1422 of the second conductor 142 could be placed at any positions having the first distance R1 from the first contact portion 1412 of the first conductor 141. The third contact portion 1432 of the third conductor 143 could be placed at any positions having the second distance R2 from the first contact portion 1412 of the first conductor 141.

Figure 5:
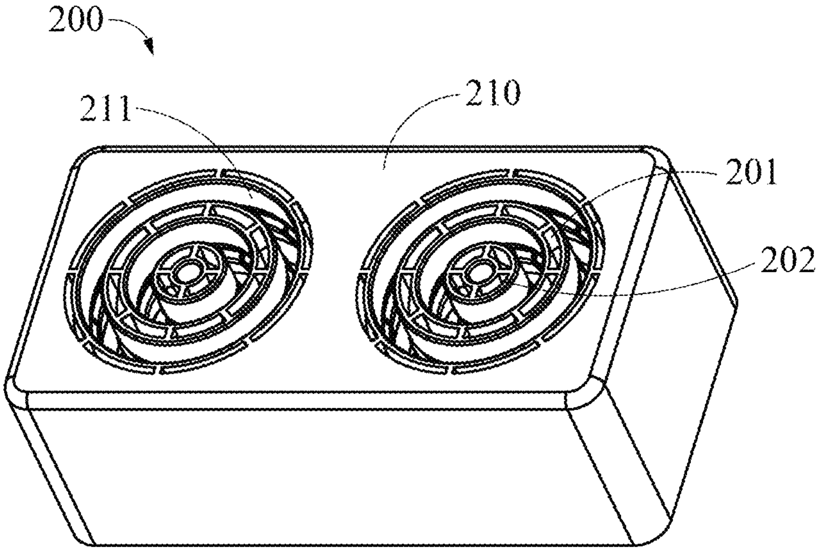
FIG. 5 is a diagram of a base according to an embodiment of the present disclosure.
Figure 6:
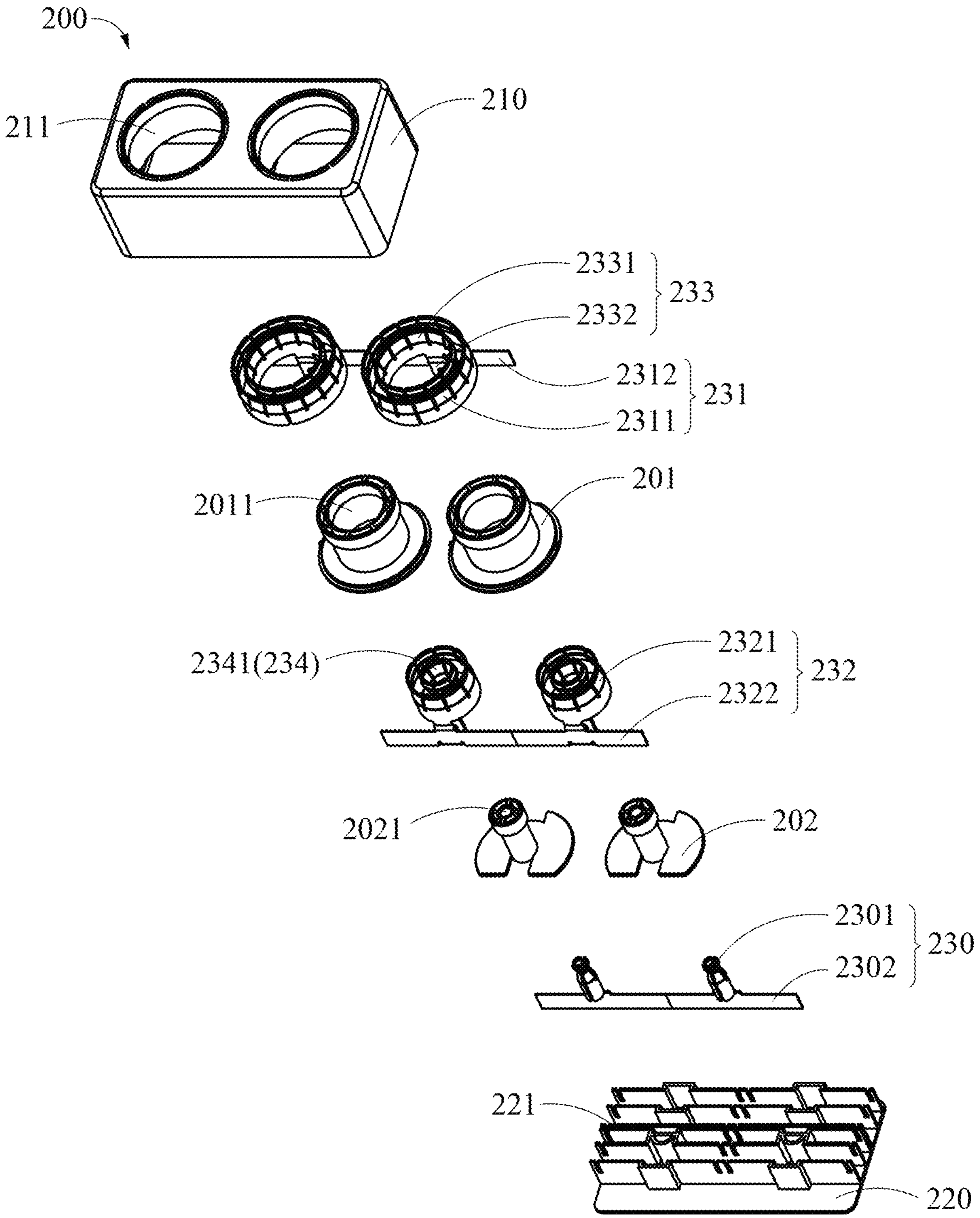
FIG. 6 is an exploded diagram of the base shown in FIG. 5.
Figure 7A:
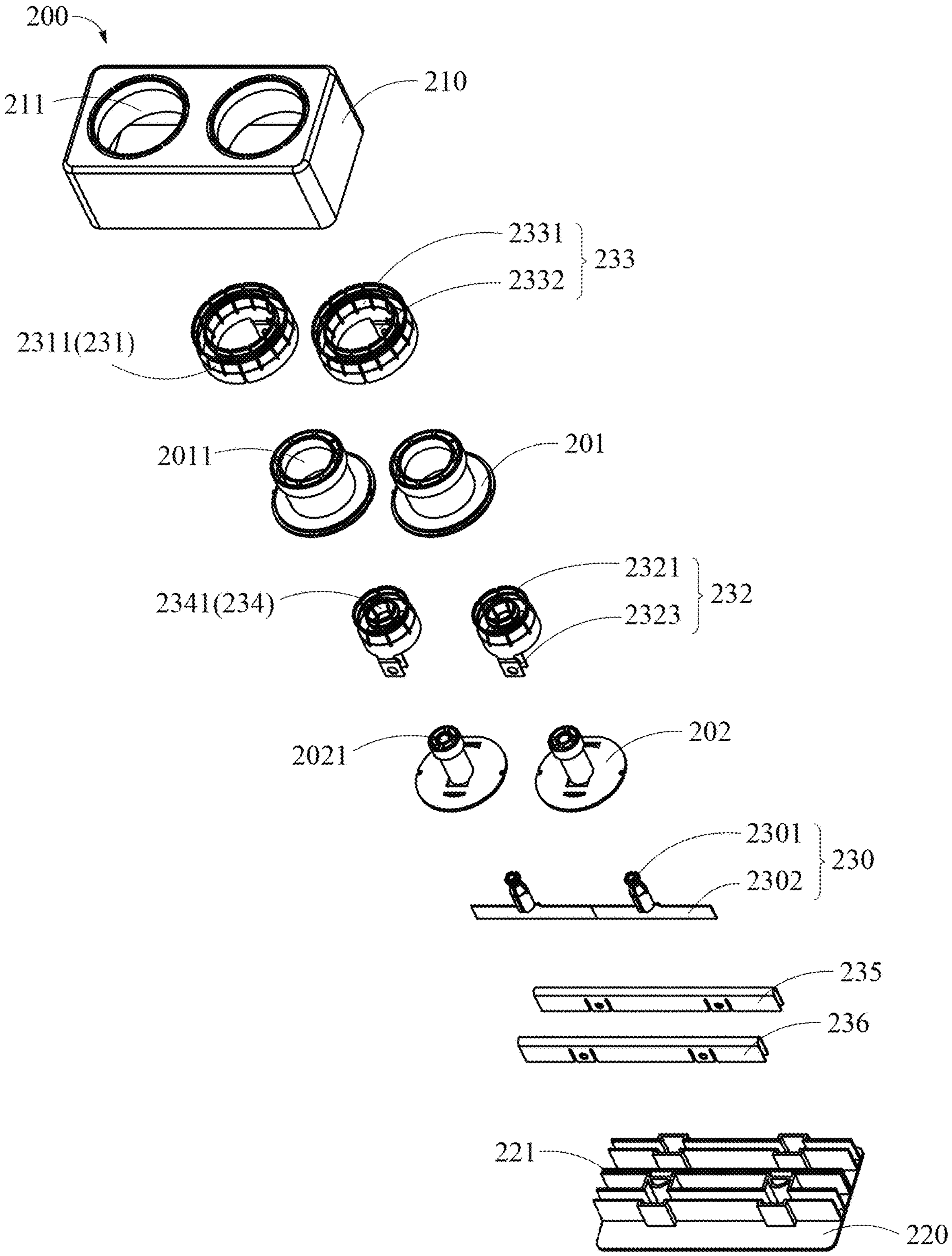
FIG. 7A is an exploded diagram of a base according to a second embodiment of the present disclosure.
Figure 7B:
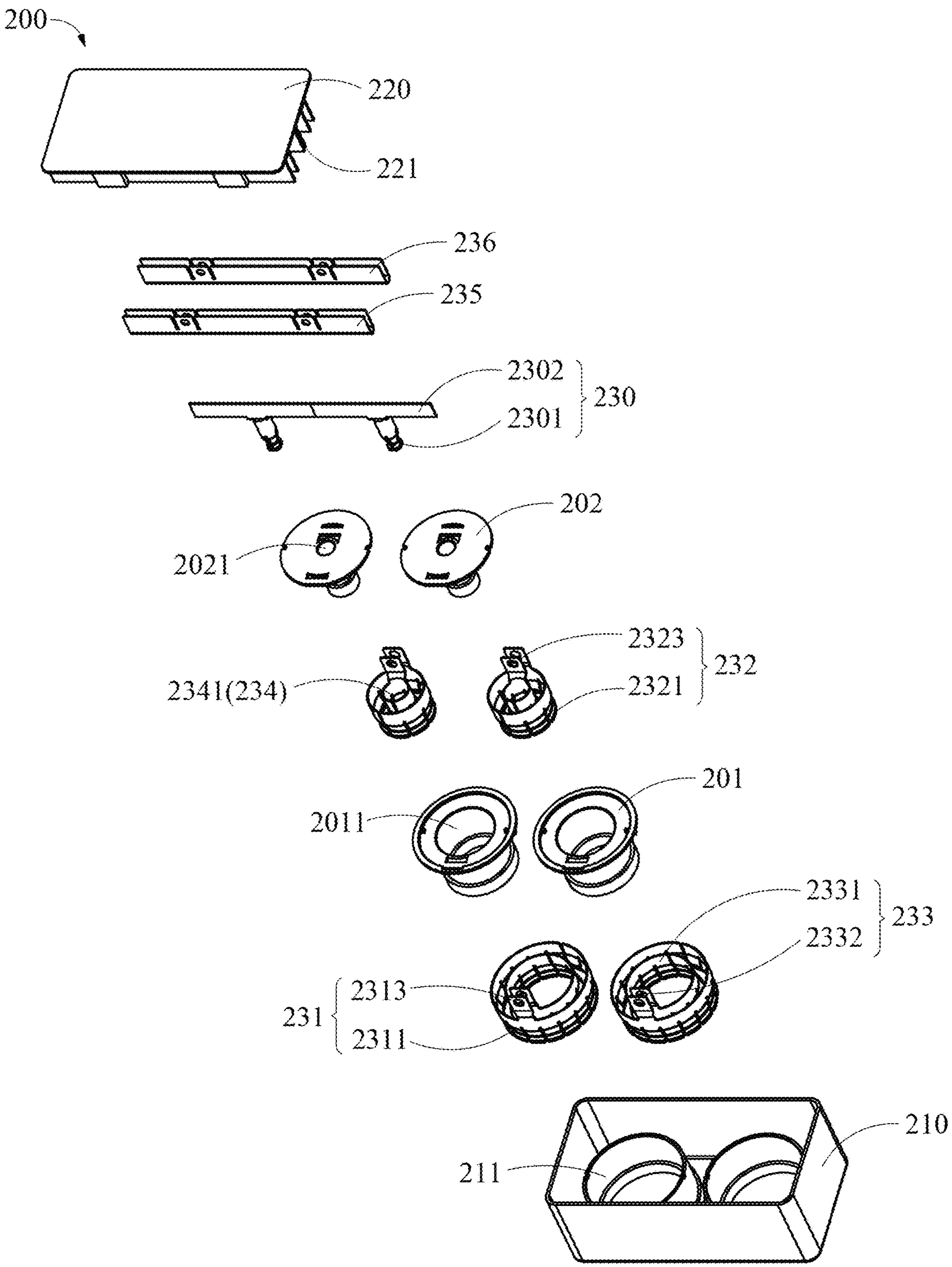
FIG. 7B is an exploded diagram of a base from another view angle according to a second embodiment of the present disclosure.

Please refer to FIG. 5, FIG. 6, FIG. 7A and FIG. 7B. FIG. 5 is a diagram of a base according to an embodiment of the present disclosure. FIG. 6 is an exploded diagram of a base according to a first embodiment of the present disclosure. FIG. 7A is an exploded diagram of a base according to a second embodiment of the present disclosure. FIG. 7B is an exploded diagram of a base from another view angle according to a second embodiment of the present disclosure. The base 200 comprises a first insulating shell 210, a second insulating shell 220, a first isolation portion 201, a second isolation portion 202 and a terminal member. The first insulating shell 210 comprises at least one socket 211. The second insulating shell 220 is positioned under the first insulating shell 210 and connected with the first insulating shell 210 to form a cavity to accommodate the terminal member. The first isolation portion 201 comprises a socket 2011. The second isolation portion 202 comprises a socket 2021. The first isolation portion 201 and the second isolation portion 202 are positioned between the first insulating shell 210 and the second insulating shell 220. In the two embodiments, the base 200 comprise two sockets 211. However, the number of the sockets and the arrangements of the sockets 211 on the base 200 are not limited in the present disclosure.

From FIG. 6, FIG. 7A and FIG. 7B, the terminal member is positioned between the first insulating shell 210 and the second insulating shell 220. The terminal member comprises a central terminal 230, a first outer ring terminal 231, a first inner ring terminal 233, a second outer ring terminal 232 and a second inner ring terminal 234. The central terminal 230 comprises a central docking portion 2301 and a center connecting portion 2302. The central docking portion 2301 is disposed correspondingly to a socket 2021 of the second isolation portion 202, and the center connecting portion 2302 allows the central terminal 230 to be fixed between the first insulating shell 210 and the second insulating shell 220. The first outer ring terminal 231 comprises a first outer ring docking portion 2311 and a first outer ring connecting portion 2312. The first outer ring docking portion 2311 is arranged correspondingly to a socket 211 of the first insulating shell 210, and the first outer ring connecting portion 2312 allows the first outer ring terminal 231 to be fixed between the first insulating shell 210 and the second insulating shell 220. The first inner ring terminal 233 comprises a first inner ring docking portion 2331 and a first inner ring welding portion 2332. The first inner ring docking portion 2331 is arranged correspondingly to a socket 211 of the first insulating shell 210, and the first inner ring welding portion 2332 is electrically connected to the first outer ring connecting portion 2312. The second outer ring terminal 232 comprises a second outer ring docking portion 2321 and a second outer ring connecting portion 2322. The second outer ring docking portion 2321 is arranged correspondingly to a socket 2011 of the first isolation portion 201, and the second outer ring connecting portion 2322 allows the second outer ring terminal 232 to be fixed between the first insulating shell 210 and the second insulating shell 220. The second inner ring terminal 234 comprises a second inner ring docking portion 2341 and a second inner ring welding portion 2342. The second inner ring docking portion 2341 is arranged correspondingly to a socket 2011 of the first isolation portion 201, and the second inner ring welding portion 2342 is electrically connected to the second outer ring connecting portion 2322.

The first outer ring docking portion 2311 of the first outer ring 231 terminal and the first inner ring docking portion 2331 of the first inner ring terminal 233 are disposed correspondingly to a same socket 211, and the second outer ring docking portion 2321 of the second outer ring terminal 232 and the second inner ring docking portion 2341 of the second inner ring terminal 234 are disposed correspondingly to a same socket 2011. In the two embodiments, the specification of the terminal member and the way of arranging the terminal member between the first insulating shell 210 and the second insulating shell 220 are not limited in the present disclosure.

As shown in FIG. 5 and FIG. 6, the base 200 comprises the first isolation portion 201, placed between the first inner ring docking portion 2331 of the first inner ring terminal 233 and the second outer ring docking portion 2321 of the second outer ring terminal 232. Furthermore, the base 200 comprises the second isolation portion 202, placed between the second inner ring docking portion 2341 of the second inner ring terminal 234 and the central docking portion 2301 of the central terminal 230. Through the first isolation portion 201 and the second isolation portion 202, the first inner ring terminal 233 and the second outer ring terminal 232 could have a certain space in between, and the second inner ring terminal 234 and the central terminal 230 could also have a certain space in between. In this way, the electrical characteristic of the electrical connector 100 and the base 200 is not affected by the abrasion when they are assembled and thus the life time of the product could be elongated.

In the two embodiments, the structures of the first isolation portion 201 and the second isolation portion 202 extend to the space between the first insulating shell 210 and the second insulating shell 220. Therefore, the first insulating shell 210 and the second insulating shell 220 have a certain space in between. However, in another embodiment, the base 200 further comprises a third isolation portion, placed between the first insulating shell 210 and the second insulating shell 220. Through the third isolation portion, the electrical characteristic of the electrical connector 100 and the base 200 is not affected by the abrasion when they are assembled.

As shown in FIG. 7A and FIG. 7B, different from the base 200 of the previous embodiment, the base 200 comprises an external conductor connecting member 235, which is electrically connected to the first outer ring welding portion 2313 of the first outer ring terminal 231 and the first inner ring welding portion 2332 of the first inner ring terminal 233. Furthermore, the base 200 comprises an inner conductor connecting member 236, which is electrically connected to the second outer ring welding portion 2323 of the second outer ring terminal 232 and the second inner ring welding portion 2342 of the second inner ring terminal 234. Through the connecting members, the connections between the terminals are ensured and thus the conducting performance could be maintained at a certain degree.

In addition, as shown in FIG. 7A and FIG. 7B, the structures of the external conductor connecting member 235 and the inner conductor connecting member 236 are corresponding to the grooves in the second insulating shell 220. In this embodiment, the second insulating shell 220 has three grooves 221, which could respectively be assembled with the center connecting portion 2302 of the central terminal 230, the external conductor connecting member 235 and the inner conductor connecting member 236. From the above, it could be known that the center connecting portion 2302 of the central terminal 230, the first outer ring welding portion 2313 of the first outer ring terminal 231, the first inner ring welding portion 2332 of the first inner ring terminal 233, the second outer ring welding portion 2323 of the second outer ring terminal 232, the second inner ring welding portion 2342 of the second inner ring terminal 234 and the second insulating shell 200 have corresponding structures to make the terminal member and the second insulating shell 220 stably fixed. This allows the electrical connector 100 to endure enormous number of assembling operations.

Figure 8:
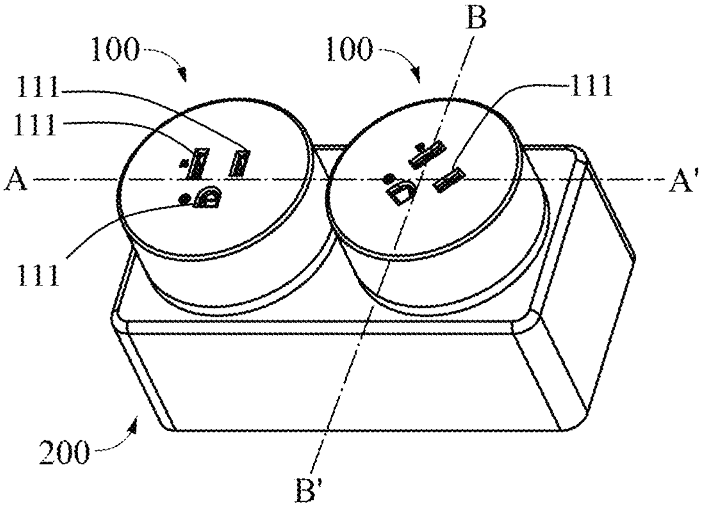
FIG. 8 is a diagram showing the assembled electrical connector and the base according to an embodiment of the present disclosure.
Figure 9:
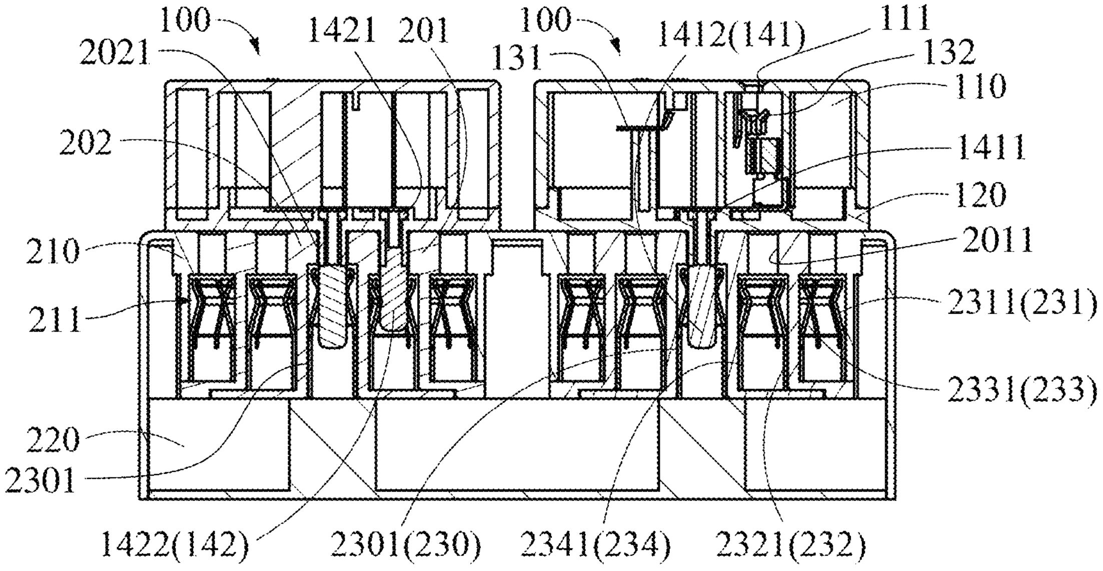
FIG. 9 is a cross-sectional view taken along the line A-A' of FIG. 8.
Figure 10:
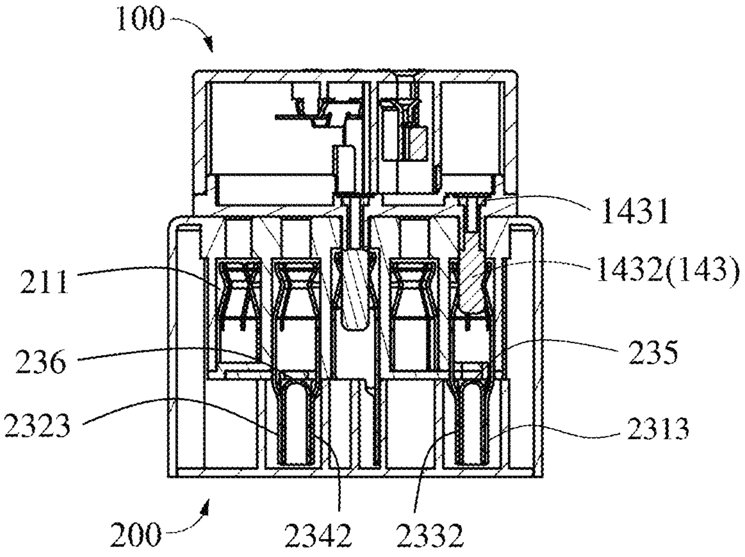
FIG. 10 is a cross-sectional view taken along the line B-B' of FIG. 8.

According to an embodiment, an electrical connector assembly is disclosed. The electrical connector assembly comprises the above-mentioned electrical connector 100 and the base 200. Please refer to FIG. 8 to FIG. 10. FIG. 8 is a diagram showing the assembled electrical connector and the base according to an embodiment of the present disclosure. FIG. 9 is a cross-section view of the A-A' line shown in FIG. 8. FIG. 10 is a cross-section view of the B-B' line shown in FIG. 8. When the electrical connector 100 and the base 200 are being assembled, the first contact portion of the first conductor 141 passes through one socket 2021 of the second isolation portion 202 to be electrically connected to the central docking portion 2301 of the central terminal 230. The second contact portion 1422 of the second conductor 142 passes though one socket 2011 of the first isolation portion 201 to be electrically connected to the second inner ring docking portion 2341 of the second inner ring terminal 234 and the second outer ring docking portion 2321 of the second outer ring terminal 232. The third contact portion 1432 of the third conductor 143 passes through one socket 211 of the first insulating shell 210 to be electrically connected to the first outer ring docking portion 2311 of the first outer ring terminal 231 and the first inner ring docking portion 2331 of the first inner ring terminal 233.

In the electrical connector 100, the second contact portion 1422 of the second conductor 142 could be positioned at any positions having the first distance R1 from the first contact portion 1412 of the first conductor. The third contact portion 1432 of the third conductor 143 could be positioned at any positions having the second distance R2 from the first contact portion 1412 of the first conductor 141. The length DC of the first contact portion 1412 of the first conductor 141 exposed to the lower insulating shell 120 is greater than the length D1 of the second contact portion 1422 of the second conductor 142 exposed to the lower insulating shell 120 and is greater than the length D2 of the third contact portion 1432 of the third conductor 143 exposed to the lower insulating shell 120. When it's assembled with the base 20, the socket 2021 of the central terminal 230 docked with the first conductor 141 is taken as the center of the circle. if other sockets corresponding to the other terminal members of the base 200 is overlapped with the contour of rotating the second conductor 142 and the third conductor 143 of the electrical connector 100. The electrical connector 100 and the base 200 could be assembled without any specific direction.

By means of the structural design between the conductor members of the electrical connector 100 and the base 200, the electrical connector 100 can be assembled with the base 200 as long as the first conductor 141 of the electrical connector 100 is aligned with the socket 2021 corresponding to the central terminal 230 of the base 200. It is convenient for users to install and use, so the manufacturer can save the cost caused by providing the fool-proof structure. In addition, by arranging the isolation portions and connector members, the structure stability of the electrical connector 100 and the base 200 could be ensured.

From the above, the electrical connector 100 and the base 200 could be assembled with no specific assembly direction. The manufacturer can save the cost caused by providing the fool-proof structure, and the designer can have more flexibility to design the circuit layout.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. An electrical connector, comprising:

an upper insulating shell, having a plurality of outer sockets;

a lower insulating shell, arranged under the upper insulating shell and connected with the upper insulating shell;

a first-polarity conductive terminal, provided with a first elastic piece portion and a first connecting portion, wherein the first elastic piece portion is correspondingly arranged with one of the outer sockets of the upper insulating shell;

a second-polarity conductive terminal, provided with a second elastic piece portion and a second connecting portion, wherein the second elastic piece portion is correspondingly arranged with one of the outer sockets of the upper insulating shell;

a third-polarity conductive terminal, provided with a third elastic piece portion and a third connecting portion, wherein the third elastic piece portion is correspondingly arranged with one of the outer sockets of the upper insulating shell;

a first conductor, electrically connected to the first connecting portion of the first-polarity conductive terminal, having a first fixing portion and a first contact portion, and the first fixing portion allows the first conductor to be fixed to the lower insulating shell;

a second conductor, electrically connected to the second connecting portion of the second-polarity conductive terminal, having a second fixing portion and a second contact portion, and the second fixing portion allows the second conductor to be fixed to the lower insulating shell;

a third conductor, electrically connected to the third connecting portion of the third-polarity conductive terminal, having a third fixing portion and a third contact portion, and the third fixing portion allows the third conductor to be fixed to the lower insulating shell;

wherein the first contact portion of the first conductor, the second contact portion of the second conductor, and the third contact portion of the third conductor are positioned outside the lower insulating shell, and part of each of the first fixing portion, the second fixing portion, and the third fixing portion is disposed in the lower insulating shell, wherein a distance between the second contact portion of the second conductor and the first contact portion of the first conductor is a first distance, a distance between the third contact portion of the third conductor and the first contact portion of the first conductor is a second distance, and the first distance is shorter than the second distance.

2. The electrical connector of claim 1, wherein a length of the first contact portion exposed to the lower insulating shell is longer than a length of the second contact portion exposed to the lower insulating shell or a length of the third contact portion exposed to the lower insulating shell.

3. The electrical connector of claim 1, wherein the lower insulting shell has at least one extension portion, partially covered by the first contact portion of the first conductor, the second contact portion of the second conductor or the third contact portion of the third conductor.

4. A base, comprising:

a first insulating shell, having at least one base socket;

a second insulating shell, positioned under the first insulating shell and connected with the first insulating shell;

a first isolation portion, having a first isolation socket;

a second isolation portion, having a second isolation socket, wherein the first isolation portion and the second isolation portion are positioned between the first insulating shell and the second insulating shell;

a central terminal, provided with a central docking portion and a center connecting portion, wherein the central docking portion is disposed correspondingly to the second isolation socket of the second isolation portion, and the center connecting portion allows the central terminal to be fixed between the first insulating shell and the second insulating shell;

a first outer ring terminal, provided with a first outer ring docking portion and a first outer ring connecting portion, wherein the first outer ring docking portion is arranged correspondingly to the base socket of the first insulating shell, and the first outer ring connecting portion allows the first outer ring terminal to be fixed between the first insulating shell and the second insulating shell;

a first inner ring terminal, provided with a first inner ring docking portion and a first inner ring welding portion, wherein the first inner ring docking portion is arranged correspondingly to the base socket of the first insulating shell, and the first inner ring welding portion is electrically connected to the first outer ring connecting portion;

a second outer ring terminal, provided with a second outer ring docking portion and a second outer ring connecting portion, wherein the second outer ring docking portion is arranged correspondingly to the first isolation socket of the first isolation portion, and the second outer ring connecting portion allows the second outer ring terminal to be fixed between the first insulating shell and the second insulating shell; and a second inner ring terminal, provided with a second inner ring docking portion and a second inner ring welding portion, wherein the second inner ring docking portion is arranged correspondingly to the first isolation socket of the first isolation portion, and the second inner ring welding portion is electrically connected to the second outer ring connecting portion;

wherein the first outer ring docking portion of the first outer ring terminal and the first inner ring docking portion of the first inner ring terminal are disposed correspondingly to the base socket, and the second outer ring docking portion of the second outer ring terminal and the second inner ring docking portion of the second inner ring terminal are disposed correspondingly to the first isolation socket.

5. The base of claim 4, wherein the first isolation portion is positioned between the first inner ring docking portion of the first inner ring terminal and the second outer ring docking portion of the second outer ring terminal.

6. The base of claim 4, wherein the second isolation portion is positioned between the second inner ring docking portion of the second inner ring terminal and the central docking portion of the central terminal.

7. A base comprising:

a first insulating shell, having at least one base socket;

a second insulating shell, positioned under the first insulating shell and connected with the first insulating shell;

a first isolation portion, having a first isolation socket;

a second isolation portion, having a second isolation socket, wherein the first isolation portion and the second isolation portion are positioned between the first insulating shell and the second insulating shell;

a central terminal, provided with a central docking portion and a center connecting portion, wherein the central docking portion is disposed correspondingly to the second isolation socket of the second isolation portion, and the center connecting portion allows the central terminal to be fixed between the first insulating shell and the second insulating shell;

a first outer ring terminal, provided with a first outer ring docking portion and a first outer ring welding portion, wherein the first outer ring docking portion is arranged correspondingly to the base socket of the first insulating shell and is positioned between the first insulating shell and the first isolation portion, and the first outer ring welding portion is positioned between the second insulating shell and the second isolation portion;

a first inner ring terminal, provided with a first inner ring docking portion and a first inner ring welding portion, wherein the first inner ring docking portion is arranged correspondingly to the base socket of the first insulating shell and is positioned between the first insulating shell and the first isolation portion, and the first inner ring welding portion is positioned between the second insulating shell and the second isolation portion;

a second outer ring terminal, provided with a second outer ring docking portion and a second outer ring welding portion, wherein the second outer ring docking portion is arranged correspondingly to the first isolation socket of the first isolation portion and is positioned between the first isolation portion and the second isolation portion, and the second outer ring welding portion is positioned between the second insulating shell and the second isolation portion; and a second inner ring terminal, provided with a second inner ring docking portion and a second inner ring welding portion, wherein the second inner ring docking portion is arranged correspondingly to the first isolation socket of the first isolation portion and is positioned between the first isolation portion and the second isolation portion, and the second inner ring welding portion is positioned between the second insulating shell and the second isolation portion;

wherein the first outer ring docking portion of the first outer ring terminal and the first inner ring docking portion of the first inner ring terminal are disposed correspondingly to the base socket, and the second outer ring docking portion of the second outer ring terminal and the second inner ring docking portion of the second inner ring terminal are disposed correspondingly to the first isolation socket.

8. The base of claim 7, wherein the first isolation portion is positioned between the first inner ring docking portion of the first inner ring terminal and the second outer ring docking portion of the second outer ring terminal.

9. The base of claim 7, wherein the second isolation portion is positioned between the second inner ring docking portion of the second inner ring terminal and the central docking portion of the central terminal.

10. The base of claim 7, wherein the base has an external conductor connecting member, electrically connected to the first outer ring welding portion of the first outer ring terminal and the first inner ring welding portion of the first inner ring terminal.

11. The base of claim 7, wherein the base has an inner conductor connecting member, electrically connected to the second outer ring welding portion of the second outer ring terminal and the second inner ring welding portion of the second inner ring terminal.

* * * * *